(12) United States Patent
Uematsu

(10) Patent No.: US 6,208,930 B1
(45) Date of Patent: Mar. 27, 2001

(54) ENGINE CONTROL SYSTEM AND METHOD HAVING CONTROL ROUTINES OF DIFFERENT EXECUTION PRIORITIES

(75) Inventor: Yoshitaka Uematsu, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/417,311

(22) Filed: Oct. 13, 1999

(30) Foreign Application Priority Data

Dec. 28, 1998 (JP) .................................................. 10-374113

(51) Int. Cl.$^7$ .............................. G06G 7/70; G06F 17/10
(52) U.S. Cl. ........................... 701/110; 701/111; 701/115
(58) Field of Search ............................. 73/116; 701/102, 701/103, 110, 111, 115

(56) References Cited

U.S. PATENT DOCUMENTS

| | | | |
|---|---|---|---|
| 5,222,392 | 6/1993 | Baba et al. | 73/116 |
| 5,351,776 | * 10/1994 | Keller et al. | 701/111 |
| 5,499,537 | * 3/1996 | Nakayama et al. | 701/111 |
| 5,522,258 | * 6/1996 | Hafner | 701/111 |
| 5,561,600 | * 10/1996 | McCombie | 701/111 |
| 5,775,298 | * 7/1998 | Haller | 701/111 |
| 5,862,507 | * 1/1999 | Wu et al. | 701/111 |
| 6,006,155 | * 12/1999 | Wu et al. | 701/111 |

FOREIGN PATENT DOCUMENTS 6-63483  8/1994 (JP) .

* cited by examiner

Primary Examiner—Willis R. Wolfe
(74) Attorney, Agent, or Firm—Nixon & Vanderhye P.C.

(57) ABSTRACT

An engine control system checks for a misfire from a change in the rotation speed of an engine. A rotation interrupt routine is executed every 30° angular rotation of an engine crankshaft to calculate and store only the rotation speed. In one of a plurality of time interrupt routines which are executed every predetermined respective time intervals, a change in the stored rotation speed is calculated to check for a misfire of the engine. The time interrupt routines have different execution priorities which are lower than that of the rotation interrupt routine. The time interrupt routine for checking the misfire has a non-highest execution priority among the time interrupt routines so that engine control processing such as fuel injection and ignition may be executed in another of the time interrupt routines having its execution priority lower than that of the time interrupt routine for checking the misfire.

15 Claims, 6 Drawing Sheets

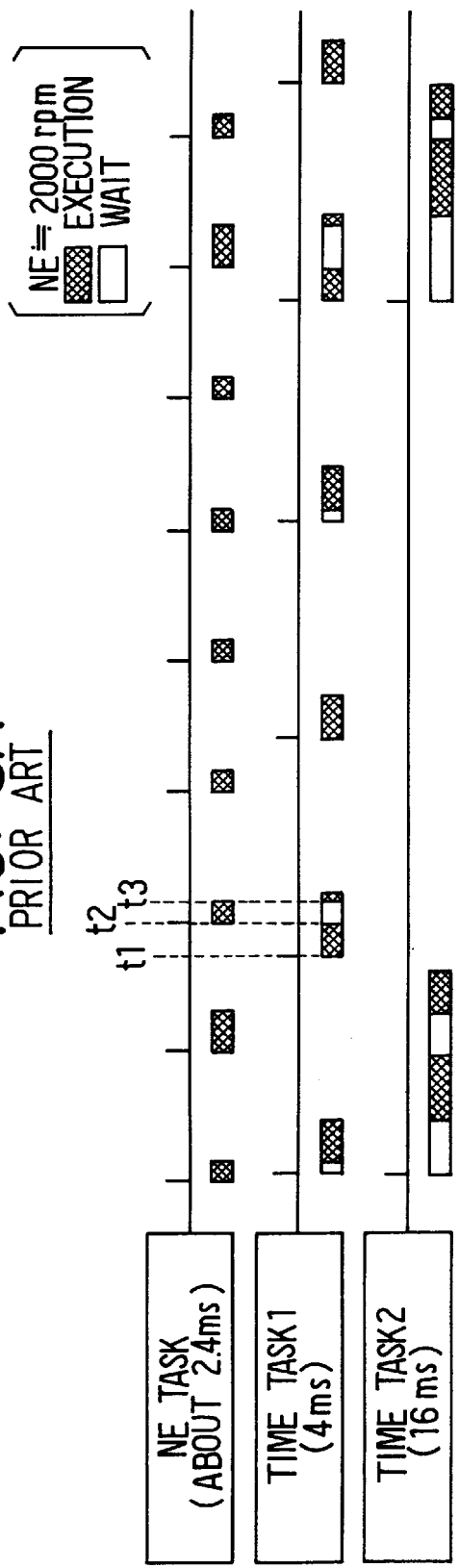
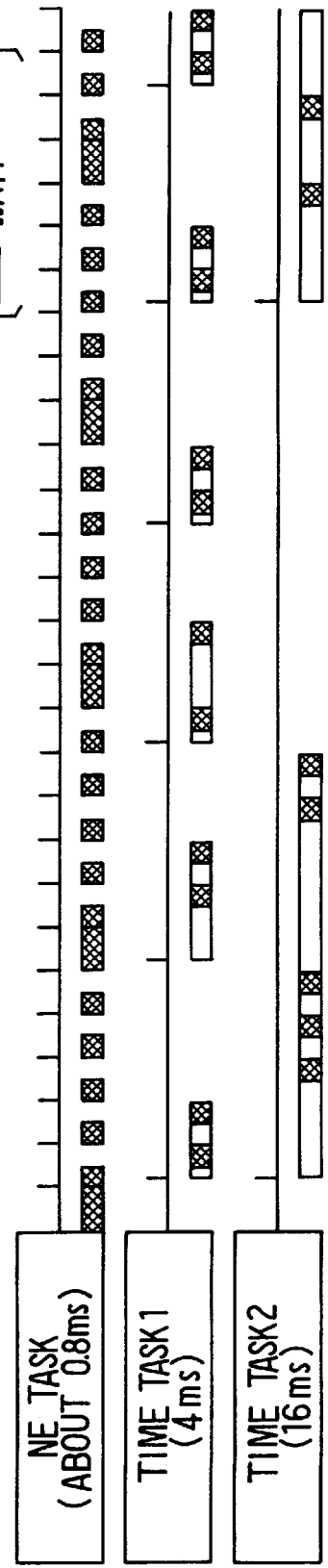
FIG. 8A PRIOR ART
FIG. 8B PRIOR ART

ENGINE CONTROL SYSTEM AND METHOD HAVING CONTROL ROUTINES OF DIFFERENT EXECUTION PRIORITIES

CROSS REFERENCE TO RELATED APPLICATION

This application relates to and incorporates herein by reference Japanese Patent Application No. 10-374113 filed on Dec. 28, 1998.

BACKGROUND OF THE INVENTION

1. Field of the Invention

The present invention relates to an engine control system for controlling vehicle-mounted engines.

2. Related Art

Vehicle-mounted engines are controlled by electronic control units including programmed microcomputers. Control programs of the microcomputer generally comprise a rotation-synchronized interrupt routine (NE task) executed every predetermined angular rotation (30° CA) of an engine crankshaft, a plurality of time-synchronized interrupt routines (time tasks) executed every respective predetermined time intervals, and a base routine executed while the above interrupt routines are not being executed. Those routines have different execution priorities. That is, the rotation interrupt routine has the highest priority. The time interrupt routines have different priorities lower than that of the rotation interrupt routine, the different priorities being increased as the predetermined time intervals of interrupts are shorter.

Specifically, the microcomputer executes its NE task and time tasks 1 and 2 as shown in FIGS. 8A and 8B. In the figures, a period of executing the task is indicated with a crossed rectangle mark, and a period of waiting because of execution of another task of higher priority is indicated with a non-crossed rectangle mark.

For instance, in FIG. 8A, it is assumed that the time task 1 which is to be executed every 4 ms is executed from time t1 under the condition that the engine rotation speed NE is in the normal range (about 2,000 rpm). When an interrupt of the NE task having the priority higher than the time task 1 arises at time t2, the time task 1 being executed is interrupted and the execution of the NE task starts. When the execution of the NE task ends at time t3, the execution of the time task 1 is resumed to complete its remaining processing. The time task 2 which is to be executed every 16 ms is interrupted for a longer period by both NE task and time task 1, because its priority is lower than the NE task and time task 1.

If the engine rotation speed NE is in the high speed range (about 6,000 rpm), the NE task is initiated every 0.8 ms as opposed to every 2.4 ms (about 2,000 rpm). Thus, as shown in FIG. 8B, the NE task is initiated more frequently, and the time tasks 1 and 2 are interrupted more frequently.

The time task 1 is designed to share a part of engine control processing, such as calculation processing related to fuel injection and ignition, which is more influential on the engine operation than the control processing shared by the time task 2. This is for the reason that the more influential calculation processing should be executed more quickly and frequently for improving control accuracy. Thus, it is likely that that the engine control accuracy cannot be improved so much as the engine rotation speed rises.

It may be possible to reduce the number of processing executed in the NE task as the engine rotation speed rises, lessening the control accuracy in the high engine speed range. However, there are many cases in which the same level of control accuracy should be maintained. For instance, in an ignition misfire detection such as disclosed in U.S. Pat. No. 5,222,392 (JP-A-5-33717), the engine rotation speed should be calculated in the NE task every predetermined angular rotation of the crankshaft for use in the misfire detection. If the misfire detection is executed in the NE task together with the engine speed calculation, the execution period of the NE task becomes longer and the time task 1 is interrupted for a longer peirod as shown in FIG. 8B.

SUMMARY OF THE INVENTION

It is therefore an object of the present invention to provide an engine control system and method which are capable of maintaining a control accuracy without reducing processing in a high engine speed range.

According to the present invention, an engine control system and method check for a predetermined engine condition such as a misfire from a change in the rotation speed of an engine. A rotation interrupt routine is executed every 30° angular rotation of an engine crankshaft to calculate and store only the calculated rotation speed. In one of a plurality of time interrupt routines which are executed every predetermined respective time intervals, a speed-related parameter such as a change in the stored rotation speed is calculated to check for the predetermined engine condition. The time interrupt routines have different execution priorities which are lower than that of the rotation interrupt routine. The time interrupt routine for checking the predetermined engine condition has a non-highest execution priority among the time interrupt routines so that engine control processing such as fuel injection and ignition may be executed in another of the time interrupt routines having its execution priority lower than that of the time interrupt routine for checking the misfire.

BRIEF DESCRIPTION OF THE DRAWINGS

The above and other objects, features and advantages of the present invention will become more apparent from the following detailed description made with reference to the accompanying drawings. In the drawings:

FIGS. 8A and 8B are timing diagrams showing operations of a microcomputer used in a conventional engine control system.

DETAILED DESCRIPTION OF THE PREFERRED EMBODIMENT

Figure 1:
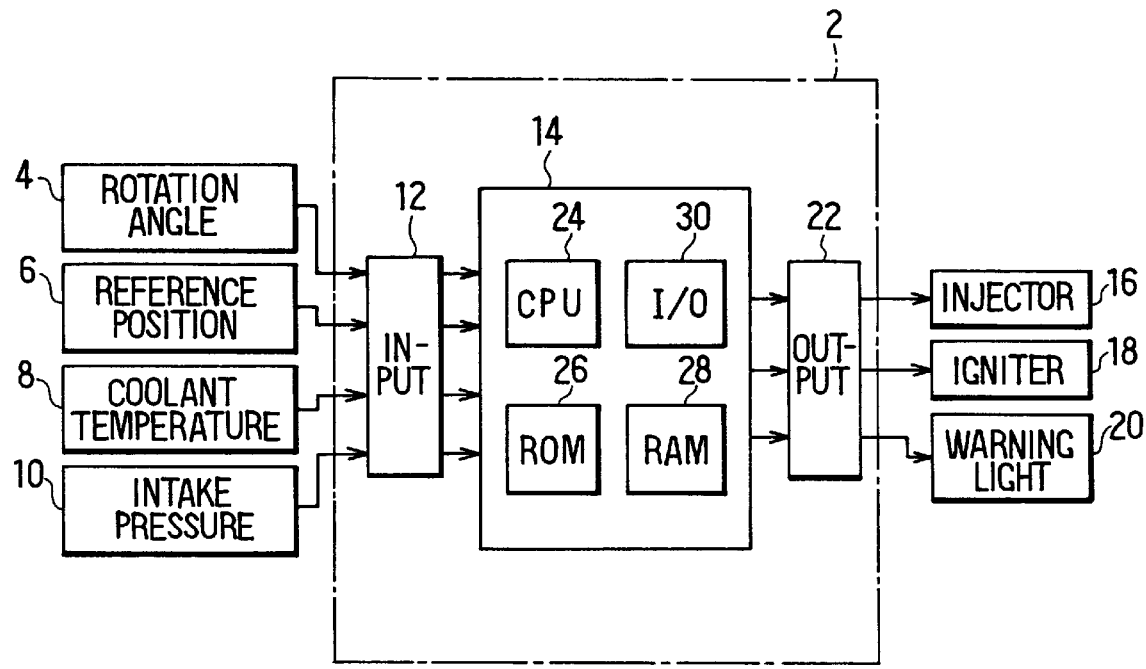
FIG. 1 is a block diagram showing an engine control system according to an embodiment of the present invention.

Referring first to FIG. 1 showing an engine control system, an engine control unit (ECU) 2 is connected to various engine condition detecting sensors. The sensors include a rotation angel sensor 4, a reference position sensor 6, an engine coolant temperature sensor 8, an intake pressure sensor 10 and the like. The rotation angle sensor 4 produce a pulse signal each time an engine crankshaft rotates a predetermined angular interval (30° CA), and the reference position sensor 6 produces a pulse signal each time a piston of a specified engine cylinder arrives at a predetermined position (TDC: top dead center). The coolant temperature sensor 8 produces a signal which varies with the engine coolant temperature, and the intake pressure sensor produces a signal which varies with the pressure of air sucked into the engine through an intake pipe.

The ECU 2 comprises an input circuit 12, a microcomputer 14 and an output circuit 22. The input circuit 12 shapes the sensor output signals and converts into digital signals. The microcomputer 14 includes, as known in the art, a CPU 24, a ROM 26, a RAM 28 and an input/output (I/O) circuit 30, and executes control processing required for engine control such as fuel injection, ignition and the like. The output circuit 22 converts output digital signals of the microcomputer 14 into corresponding drive signals to drive fuel injectors 16, an igniter 18 for spark ignitions and a warning light 20.

The microcomputer 14, particularly the CPU 24, is programmed to execute various control programs stored in the ROM 26. Specifically, the control programs includes the following routines:
(1) rotation-synchronized routine (NE task) initiated every 30° CA angular rotation of the crankshaft in response to the pulse signal of the rotation angle sensor 4 and having the highest execution priority;
(2) a plurality of time-synchronized routines (time tasks) initiated every different predetermined time interval and having different execution priorities which are lower than that of the NE task; and
(3) a base routine (base task) executed while neither the NE task nor the time task are being executed and having the lowest execution priority.

The time tasks includes time tasks A, B, C and D which are initiated every 4 ms, 8 ms, 16 ms and 65 ms, respectively. The time task A is for calculating engine control values which are most influential on the control accuracy of the fuel injection, ignition and the like. The time task A is known in the art. The time task B is for detecting an ignition failure (misfire) in cooperation with the NE task. The time task C is for detecting engine conditions such as the intake air pressure and the coolant temperature from the sensor output signals. The time task D is for executing fail-safe processing based on the misfire detection result of the task B.

The time tasks further includes a task initiated every 1 ms for counting an elapsed time to time the time tasks A, B, C and D. The time tasks are assigned with respective execution priorities which increase as the interrupt intervals decreases. That is, the execution priority is lowered in the order from task A to task D.

Figure 2:
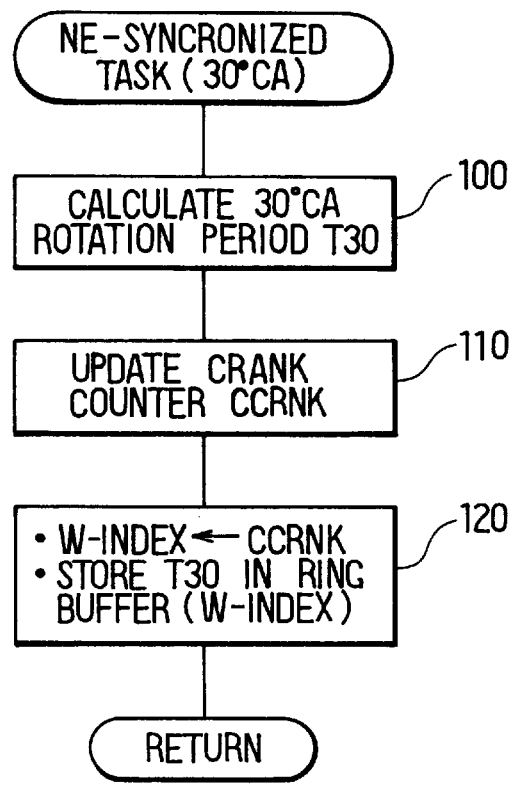
FIG. 2 is a flow diagram showing a rotation-synchronized task executed every 30° CA by a microcomputer used in the engine control system shown in FIG. 1.

The microcomputer 14, particularly the CPU 24, executes the NE task every 30° CA rotation as shown in FIG. 2 by interrupting any other tasks. First, the CPU 24 calculates at step 100 a time period (30° CA period) T30 in which the engine crankshaft rotates the angular interval of 30° CA. The time period T30 is calculated from the difference between a previous time and a present time of initiation of the NE task which can be derived from the count of a free-run counter in the microcomputer 14. This time period T30 indicates the time period between two successive pulse signals produced form the rotation angle sensor 4 and changes in inverse proportion to the engine rotation speed.

The CPU 24 updates at step 110 the count of a crank counter CCRNK which indicates a present angular position of the engine crankshaft by counting the number of pulse signals produced from the rotation angle sensor 4. The crank counter changes its count from 0 to 23, because 24 pulse signals are produced in one engine cycle (two rotations of crankshaft=720° CA) from the rotation angle sensor 4. The crank counter is reset to zero (0) when the pulse signal is produced from the reference position sensor 6, that is, when the piston of the specified cylinder arrives at its TDC position. Thus, the count of the crank counter CCRNK indicates the crankshaft rotation position from the TDC position of the specified cylinder.

Figure 3:
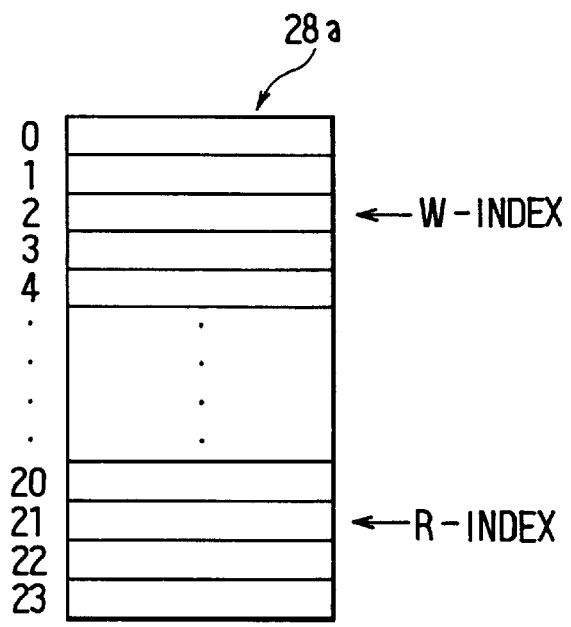
FIG. 3 is a schematic diagram showing a ring buffer used in the engine control system shown in FIG. 1.

The CPU 24 stores at step 120 the presently calculated period data T30 in one data storage area of a ring buffer 28a provided in the RAM 28 as shown in FIG. 3, thus ending this NE task. Specifically, the ring buffer 28a has 24 data storage areas from 0 to 24 and sequentially stores the calculated period data T30 calculated twenty-four times in one engine cycle (720° CA).

The CPU 24 further sets at step 120 the count of the crank counter CCRNK updated at step 110 as a writing index W-INDEX, and stores the presently calculated period data T30 in one data storage area of the ring buffer 28a which corresponds to the storage area number indicated by the writing index W-INDEX.

As described later, the period data T30 stored in the storage area which corresponds to a reading index R-INDEX is read out from the ring buffer 28a in the time task B (FIG. 4) which is executed every 8 ms. It is to be noted that the value of the writing index W-INDEX does not exceed the value of the reading index R-INDEX. For this purpose, the time task B is set to read out at a specified frequency the period data T30 stored in the NE task so that the period data T30 which has not been read out in the time task B will not be overwritten with the period data T30 newly calculated in the NE task. Thus, the data storage area of the ring buffer 28a set by the writing index W-INDEX is always held empty with the period data, because the period data T30 stored therein has been already read out in the time task B.

Figure 4:
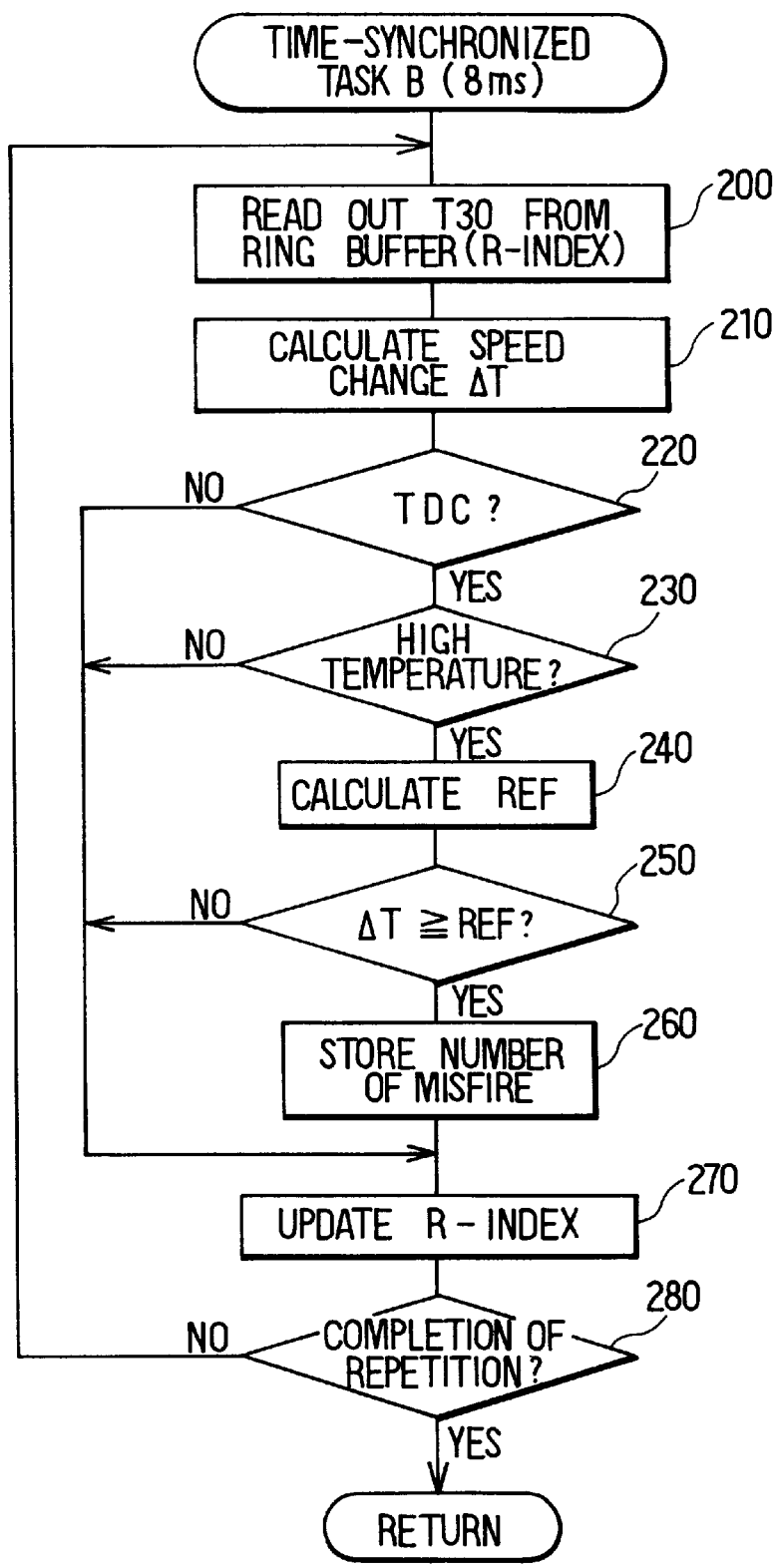
FIG. 4 is a flow diagram showing a time-synchronized task executed every 8 ms by the microcomputer shown in FIG. 1.

The CPU 24 executes the time task B every 8 ms as shown in FIG. 4, by interrupting other tasks having the lower execution priority. The CPU 24 reads out at step 200 the period data T30 stored in the storage address which corresponds to the value of the reading index R-INDEX which is updated at step 270. The period data T30 read out at step 200 first after the initiation of the time task B is the oldest one of the period data T30 sequentially written into the ring buffer 28a.

The CPU 24 then calculates at step 210 a change ΔT of the engine rotation speeds from the following equations.

$$\Delta T = DT(i) - DT(i-3)$$

$$DT(i) = T30(i) - T30(i-2)$$

In the above equations, T30(i) and T30(i-2) indicate the period data read out at step 200 presently and two times before, respectively. DT(i-3) indicates the difference DT(i) calculated at step 210 three times before, and corresponds to the difference T30(i-3)–T30(i-5) between the period data T30(i-3) and T30(i-5) read out from the ring buffer 28a at step 200 three times and five times before, respectively.

The CPU 24 checks at step 220 whether the period data T30 presently read out is the one which corresponds to the data at the TDC position of any cylinders. This checking may be made by dividing the present value of the reading index R-INDEX by 4 in the case of a six-cylinder engine. If the remainder of this division is zero (0), it is determined to be the data at the TDC position.

If the check result at step 220 is NO, the processing proceeds to step 270. If the check result is YES, the CPU 24 checks at step 230 whether the engine coolant temperature is higher than a reference temperature. Here, the temperature data used at step 230 is the one which has been updated and stored in a storage area (control data storage area) other than the ring buffer 28a of the RAM in the time task C which is executed every 16 ms.

Figure 5:
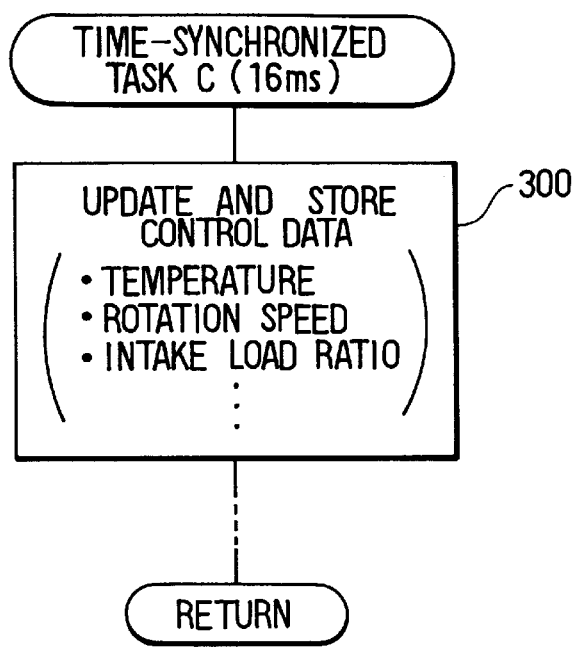
FIG. 5 is a flow diagram showing a time-synchronized task executed every 16 ms by the microcomputer shown in FIG. 1.

That is, as shown in FIG. 5, the CPU 24 calculates and updates at step 300 of the time task C various control data required for calculating the fuel injection amount, ignition timing and the like. The control data includes the engine coolant temperature, engine rotation speed, intake load rate and the like. The intake load rate is calculated from the output signal produced by the intake air pressure sensor 10. The CPU 24 processes other steps (not shown) after step 300 and ends its time task C.

If the check result at step 230 is NO, the processing proceeds to step 270. If it is YES, however, the CPU 24 reads out at step 240 the engine rotation speed and the intake load rate from the control data storage area of the RAM 28 to calculate a reference REF for determining an occurrence of misfire. The reference is calculated as an engine rotation speed change, because the engine rotation speed changes noticeably when a misfire occurs.

The CPU 24 then checks at step 240 whether the speed change ΔT calculated at step 210 is larger than the reference REF. If the check result at step 240 is NO, the processing proceeds to step 270. If it is YES indicating the occurrence of misfire, however, the CPU 24 increments by one (1) at step 260 the number of misfire stored in the storage area of the RAM 28 other than the ring buffer 28a and the control data storage area.

The CPU 24 updates at step 270 the reading index R-INDEX. That is, the reading index R-INDEX is basically incremented by one (1). If the incremented index exceeds 23, it is returned to zero (0). Thus, the reading index R-INDEX is incremented one by one up to 23 and is then returned to zero (0).

As a result of updating the reading index R-INDEX at step 270, the oldest one of the period data T30 sequentially stored in the ring buffer 28a now becomes the period data T30 stored in the data storage area corresponding to the value of the updated reading index R-INDEX. The data storage area which corresponds to the value of the reading index R-INDEX before the updating becomes empty with no data.

The CPU 24 finally checks at step 280 whether the above sequence of steps 200–270 has been repeated a predetermined number of times. This checking may be attained by comparing the value of the reading index R-INDEX updated at step 270 reaches the value of the writing index W-INDEX which is updated at step 120 in the NE task (FIG. 2). If the check result at step 280 is NO, the processing returns to step 200 so that the steps 200–270 are repeated until all the period data T30 stored in the ring buffer 28a are read out. If it is YES, however, the CPU 24 end this time task B.

Figure 6:
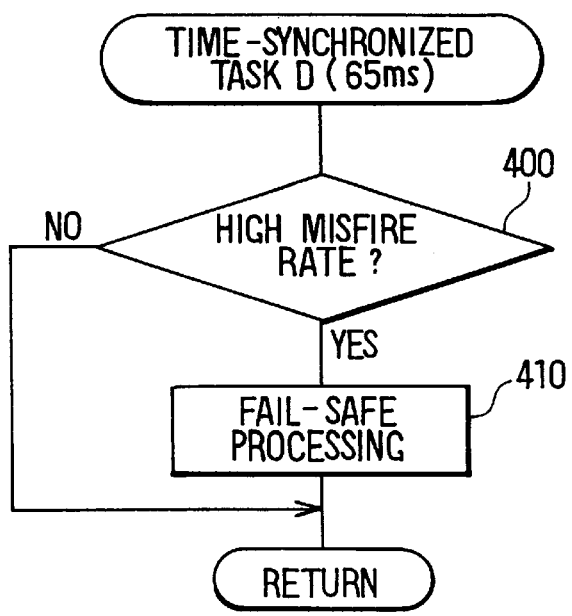
FIG. 6 is a flow diagram showing a time-synchronized task executed every 65 ms by the microcomputer shown in FIG. 1.

The CPU 24 executes the time task D every 65 ms as shown in FIG. 6. Specifically, the CPU 24 reads out at step 400 the number of misfires cumulatively counted and stored in the RAM 28 at step 260 in the time task B, and checks whether the misfire rate is high by comparing the number of misfires with a predetermined threshold value. If the check result at step 400 is NO, the processing ends. If it is YES, however, the CPU 24 drives the warning light 20 to indicate the occurrence of misfires at a high rate and sets a failure diagnosis flag in the RAM 28 to store the same.

Figure 7:
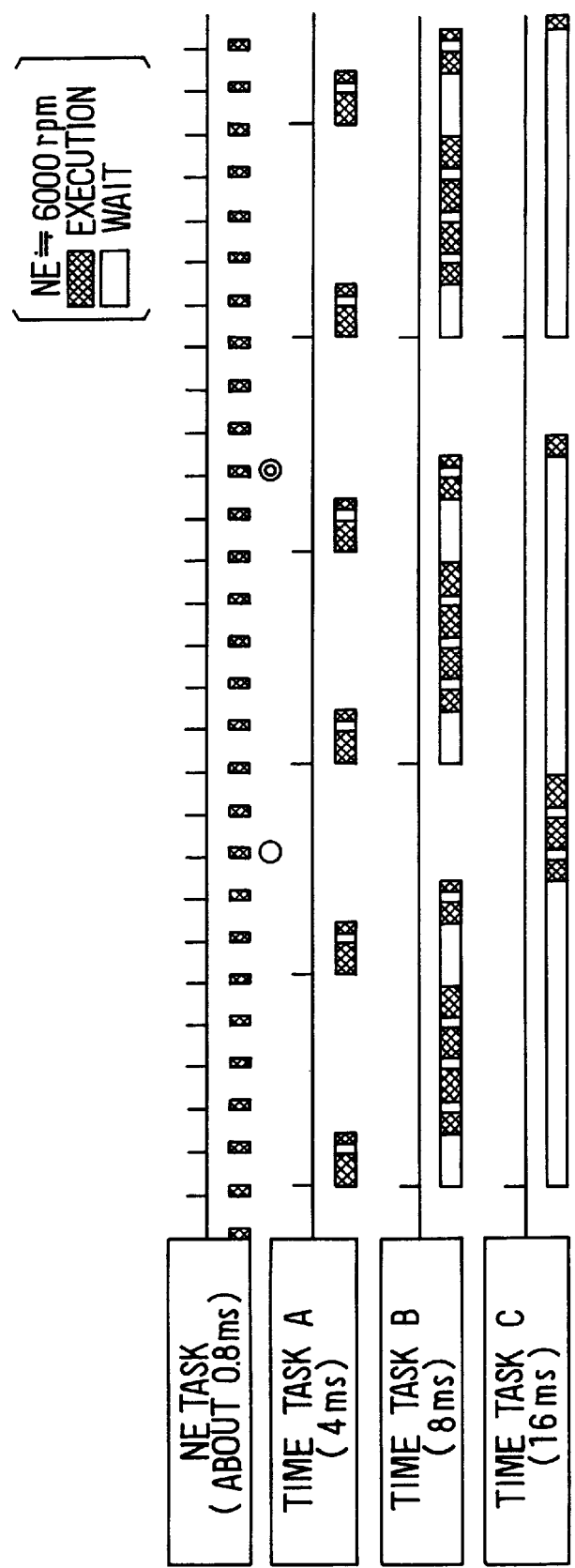
FIG. 7 is a timing diagram showing an operation of the microcomputer shown in FIG. 1.

The processing of the above tasks are shown in FIG. 7, in which it is assumed that the engine rotation speed NE is about 6,000 rpm at which the NE task is executed every about 0.8 ms. The execution period of the task and the interrupted period (wait period) are indicated with a crossed rectangle mark and a non-crossed rectangle mark in the figure. It is to be understood that all the period data T30 stored in the ring buffer 28a in the NE tasks (indicated as starting from ○-marked task to ⊙-marked task) after the period data T30 read out last from the ring buffer 28a in the previous execution of the time task B are read out sequentially in the time task B. Those period data T30 thus read out are used to check for an occurrence of misfire.

As described above, the misfire detection processing in the ECU 2 is divided into a first processing (steps 100–120) for calculating the period data T30 corresponding to engine crankshaft rotation speed and sequentially storing the calculated period data T30 in the ring buffer 28a, and a second processing (steps 200–280) for sequentially reading out the stored period data T30 and checking for an occurrence of misfire. Further, the first processing is executed in the NE task which is initiated every 30° CA rotation, and the second processing is executed in the time task B which is initiated every 8 ms. That is, only the calculation of the engine speed is executed in the NE task and the other processing for the misfire detection is executed in the time task B. The time task B has a lower priority than the time task A which is initiated every 4 ms to execute a control processing which influence the accuracy of controlling the engine.

As a result, the execution period of NE task in the ECU 2 is shortened as shown in FIG. 7 in comparison with the conventional case (FIG. 8B) in which both the engine speed detection and the misfire detection are executed in the NE task. Thus, even when the engine is in the high rotation speed range in which the NE task is initiated more frequently, the period of waiting of the time task A having the higher priority than the time task B is shortened. That is, the control processing shared by the task A can be executed quicky.

More specifically, in the present embodiment, the NE task does not occupy the execution periods of the time tasks A to C so much, the initiation time point of the time task A which corresponds to the time task 1 in FIG. 8B is not influenced so much. Further, because it is least likely that the NE task continues until the time point the next NE task should be initiated, the misfire detection can be attained up to a very high engine speed.

Further, in the time task B, only the new period data T30 which have been calculated and stored in the ring buffer 28a in the NE task after the previous execution the time task B, the misfire detection can be attained by using a plurality of new period data. The microcomputer operation becomes more efficient, because the number of the period data T30 to be read out from the ring buffer 28a is reduced in the low engine speed range and the execution period of the time task B is resultantly shortened.

In the NE task, the calculated period data are stored in the storage areas of the ring buffer 28a corresponding to the count values of the crank counter CCRNK. Thus, it can be determined simply and easily at step 220 in the time task B whether the period data T30 read out from the ring buffer 28a is the one calculated at the TDC position.

Other data such as the engine coolant temperature and the intake load rate which are also required in the misfire detection in addition to the period data T30 are calculated and stored in the time task C of 16 ms which has a lower priority than the time task B. Those other data are less important and need not be detected in real time. Therefore, the storage areas of the RAM 28 can be used most efficiently.

The present invention should not be limited to the disclosed embodiment but may be modified in many other ways without departing from the spirit of the invention.

For instance, although the engine rotation speed is calculated and stored in the ring buffer 28a as the period data T30, the time of initiation of each NE task may be stored in the ring buffer 28a. The engine rotation speed may be calculated in another task, for instance, the time task B, from a difference between two times stored successively in the ring buffer 28a.

The above embodiment may also be modified to execute other processing in addition to or in place of the misfire detection, as long as the other processing use a plurality of successively calculated engine rotation speed.

What is claimed is:

1. An engine control system comprising:
   a rotation interrupt routine which is to be initiated every predetermined angular rotation of an engine; and
   a plurality of time interrupt routines which are to be initiated every predetermined time period and have different execution priorities lower than that of the rotation interrupt routine,
   wherein the rotation interrupt routine includes a first processing for sequentially storing data corresponding to an engine rotation speed, and one of the time interrupt routines which has a non-highest execution priority among the different execution priorities includes a second processing for executing a specified determination by using the stored data.

2. An engine control system of claim 1, wherein the second processing reads out the data which are stored in the first processing subsequently from reading of the data in the second processing executed previously.

3. An engine control system of claim 1, wherein the first processing stores the data in association with information of engine rotational positions.

4. An engine control system of claim 1, wherein another of the time interrupt routines which has an execution priority lower than that of the one time interrupt routine includes a third processing for updating engine conditions other than the engine rotation speed, and the second processing further uses the updated engine conditions for executing the specified determination.

5. An engine control system of claim 1, wherein the data stored in the first processing is either one of a time period between successive two of the initiation of the rotation interrupt routine or a time point of the initiation of the rotation interrupt routine.

6. An engine control system of claim 1, wherein the specified determination includes a calculation of a change in the rotation speed of the engine and a checking for a misfire based on the calculated change.

7. An engine control system of claim 1, wherein the rotation interrupt routine only calculates and stores the rotation speed of the engine as the first processing.

8. An engine control system of claim 7, wherein the second processing calculates a change in the stored rotation speed and determines a misfire when the calculated change exceeds a reference.

9. An engine control system of claim 8, wherein another of the time interrupt routines which has an execution priority lower than that of the one time interrupt routine includes a third processing for updating engine conditions other than the engine rotation speed, and the second processing further uses the updated engine conditions for executing the specified determination.

10. An engine control system of claim 8, wherein another of the time interrupt routines which has an execution priority higher than that of the one time interrupt routine includes a third processing for controlling an operation of the engine.

11. An engine control method comprising the steps of:
    detecting a predetermined angular rotation of an engine;
    initiating with a highest execution priority a rotation interrupt routine at every detection of the predetermined angular rotation, the rotation interrupt routine including only a calculation of an engine rotation speed and storage of the calculated engine rotation speed; and
    initiating a time interrupt routine having an execution priority lower than that of the rotation interrupt routine, the time interrupt routine including a checking for a predetermined engine condition from the stored engine rotation speed.

12. An engine control system of claim 11, wherein the time interrupt routine calculates a change in the stored engine rotation speed and checks for a misfire of the engine from the calculated change.

13. An engine control system of claim 11, further comprising the step of:
    initiating another interrupt routine having an execution priority lower than that of the rotation interrupt routine and higher than that of the time interrupt routine, the another interrupt routine including a calculation of control values for controlling an engine operation.

14. An engine control system of claim 13, further comprising the step of:
    initiating a further interrupt routine having an execution priority lower than that of the another interrupt routine, the further interrupt routine including a calculation of an engine parameter other than the engine rotation speed,
    wherein the calculated engine parameter is used in the time interrupt routine to determine the predetermined engine condition.

15. An engine control system of claim 11, wherein the predetermined engine condition is checked based solely on the stored engine rotation speed which are calculated and stored in the rotation interrupt routine after a previous execution of the rotation interrupt routine.

* * * * *